United States Patent [19]

Kim

[11] Patent Number: 5,745,105

[45] Date of Patent: Apr. 28, 1998

[54] POWER SAVING APPARATUS AND METHOD OF A MONITOR

[75] Inventor: Yong-Hee Kim, Suwon, Rep. of Korea

[73] Assignee: SamSung Electronics Co., Ltd., Suwon, Rep. of Korea

[21] Appl. No.: 680,104

[22] Filed: Jul. 15, 1996

Related U.S. Application Data

[63] Continuation of Ser. No. 275,825, filed as PCT/KR93/00104, Nov. 29, 1993 published as WO94/23413, Oct. 13, 1994, abandoned.

[30] Foreign Application Priority Data

Mar. 31, 1993 [KR] Rep. of Korea ............ 1993-5327

[51] Int. Cl.$^6$ ............................................. G09G 5/00
[52] U.S. Cl. ............................................. 345/212; 345/211
[58] Field of Search ............................................. 345/211, 212, 345/213, 156, 168; 395/750.01, 750.03–750.08; 364/492, 493; 348/730, 734

[56] References Cited

U.S. PATENT DOCUMENTS

| | | |
|---|---|---|
| 4,321,593 | 3/1982 | Ho . |
| 4,649,373 | 3/1987 | Bland et al. . |
| 4,665,536 | 5/1987 | Kim . |
| 4,922,448 | 5/1990 | Kunieda . |
| 4,922,450 | 5/1990 | Rose . |
| 4,970,623 | 11/1990 | Pintar . |
| 5,153,580 | 10/1992 | Pollack . |
| 5,167,024 | 11/1992 | Simth . |
| 5,239,652 | 8/1993 | Seibert . |
| 5,241,680 | 8/1993 | Cole . |
| 5,389,952 | 2/1995 | Kikinis ............ 345/213 |
| 5,483,464 | 1/1996 | Song . |

*Primary Examiner*—Regina Liang
*Attorney, Agent, or Firm*—Robert E. Bushnell, Esq.

[57] ABSTRACT

An apparatus and method for saving power by cutting off the power supplied to a monitor when an input signal does not exist for a given time period. An input signal is checked to see if it is sensed from input means of the monitor. A power circuit is operated each time the input signal is sensed and simultaneously a time value for performing a power saving mode is set in a reference buffer. The receiving time of the input signal is counted by updating the time value set in the reference buffer each time an interrupt signal is received from a timer, and then the time value of the reference buffer is read. If the input signal is not sensed until a setting time elapses, an operating voltage of the monitor is cut off by controlling the operation of the power circuit.

34 Claims, 6 Drawing Sheets

POWER SAVING APPARATUS AND METHOD OF A MONITOR

This is a continuation of application Ser. No. 08/275,825, filed as PCT/KR93/00104, Nov. 29, 1993 published as WO94/23413, Oct. 13, 1994 now abandoned.

BACKGROUND OF THE INVENTION

The present invention relates to a monitor, and more particularly to an apparatus and method for saving power by controlling the supply of the power when a system is not used.

Generally, monitors display video signals received from a computer etc. connected thereto. Since these monitors should drive a CRT (Cathode Ray Tube), which is a display unit, by using a high voltage, the power consumption is large. In a system using the monitor, if the power supplied to the monitor is controlled when a user does not utilize the system, the power consumption of the monitor can be reduced.

There is a screen blanker for blanking data image being displayed on the monitor when a key input is not entered for a given time period in a computer system using the monitor. Such a screen blanker is disclosed in U.S. Pat. No. 5,059,961 by Te J. Cheng. The screen blanker as described in the above patent sets a time period to blank the data image on the display screen of the monitor. If there is no input for the preset time period, the data image being displayed on the monitor is cleared. If the key input is again generated, the screen blanker releases a blanking function of the monitor. Thus, the data image which had disappeared is re-displayed on the monitor.

The above patent, however, clears only the data image being displayed on the monitor. Hence, during a blanking interval, the power is still supplied to the monitor and the power consumption is almost identical to that during a normal operation. Since the blanking function is performed not by the monitor but by a main controller of the computer, additional cables are needed between the monitor and the computer. Further, since a time period to blank the screen is fixed by a counter, the blank setting time period can not be variably employed.

SUMMARY OF THE INVENTION

It is an object of the present invention to provide an apparatus and method for saving the power by cutting off the power supplied to a monitor when a system using monitor is not used for a given time period.

It is another object of the present invention to provide an apparatus and method for saving power by sensing whether or not an input signal is entered, regardless of a main controller of a computer system and cutting off the power supplied to a monitor when the input signal is not entered within a set time period in a monitor for controlling a display function by the computer system.

It is still another object of the present invention to provide an apparatus and method for freely selecting a time period for controlling the supply time of the power in a monitor.

It is a further object of the present invention to provide an apparatus and method for sequentially performing a power control operation of a monitor by setting multiple time periods for controlling the power supplied to the monitor.

It is still a further object of the present invention to provide an apparatus and method for performing a power control operation of a monitor by multiple input signals for controlling the power supplied to the monitor.

In accordance with one aspect of the invention, a power saving apparatus of a monitor includes input means for providing an external input signal; power supply signal generating means connected to the input means, for generating a power supply signal in response to the external input signal; timer interrupt means for generating a timer interrupt signal every given time period; driving means for driving the monitor in response to an operating voltage; power means connected to the driving means, for providing the operating voltage for driving the monitor to the driving means; memory means for storing a reference time value of a power saving mode; and control means for controlling the power means to provide the operating voltage to the driving means and simultaneously setting the reference time value of the power saving mode in the memory means, in response to the power supply signal generated from the power supply signal generating means, updating the reference time value stored in the memory means in response to the timer interrupt signal, and cutting off the operating voltage supplied to the driving means by controlling the power means when the reference time value stored in the memory means is a preset time value.

In accordance with another aspect of the invention, a power saving method of a monitor includes the steps of: sensing whether an external input signal is received from input means of the monitor, and operating power means each time the external input signal is received and simultaneously setting a time value for executing a power saving mode in a reference buffer; updating the time value set in the reference buffer each time a timer interrupt signal is received from a timer; and checking the time value of the reference buffer, and cutting off an operating voltage of the monitor by controlling the power means if the external input signal is not received until the setting time elapses.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 1:
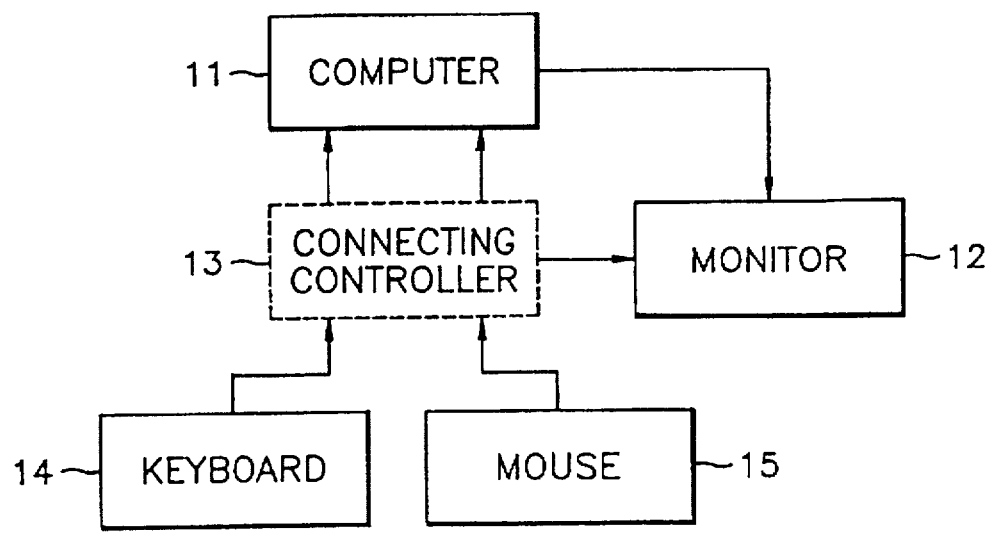
FIG. 1 is a block diagram of a power saving apparatus of a monitor according to the present invention.

In the explanation of the drawings, like reference numerals and symbols are used to designate like elements. In the following description, numerous specific details, such as the voltage value of the power supplied to a monitor, an operating time, etc., are set forth to provide a more thorough understanding of the present invention. It will be apparent, however, to one skilled in the art, that the present invention may be practiced without these specific details.

Referring to FIG. 1, there is shown a power saving apparatus of a monitor adapted to the present invention. A keyboard 14 is a first input device and generates key information by the touch of a user. A mouse 15 is a second input device and generates mouse information by handling from the user. To check whether or not an input is generated, a key clock is used where the keyboard 14 is used as the input device. Also, when the mouse 15 is used as the input device, a mouse clock signal and transmitting data are used as mouse information in the case of a PS/2 type and a RS-232C type, respectively.

Key information generated from the keyboard 14, includes a key clock signal, key data, a key reset signal, a ground signal and 5V-power. In the PS/2 type, the mouse information generated from the mouse 15 includes a mouse clock, signal mouse data, a mouse reset signal, a ground signal and 5V-power. In the RS-232C type, the mouse information consists of transmitting data and receiving data.

A connecting controller 13 is connected to the first and second input devices and receives the key clock signal from the key information generated from the keyboard 14. Moreover, the connecting controller 13 receives the mouse clock signal or the transmitting data from the mouse information generated from the mouse 15, and generates an external input signal indicating that an input signal occurs when at least one of the key clock signal, the mouse clock signal, or the transmitting data is received. The connecting controller 13 provides the key information generated from the key board 14 and the mouse information generated from the mouse 15 to a computer 11.

The computer 11 may be connected via the connecting controller 13 to the input device or directly connected to the input device. Assuming that the computer 11 is connected through the connecting controller 13 to the input devices, the computer 11 executes a corresponding function by analyzing the key information or the mouse information received through the connecting controller 13 and simultaneously generates a video signal and a synchronizing signal for implementing a display operation.

A monitor 12 receives the video signal and the synchronizing signal from the computer 11 and receives the external input signal from the connecting controller 13. The monitor 12 has a buffer for setting a reference time in order to save power, a timer interrupt signal generator, a power supplier for generating the power necessary for the monitor, a display unit, a driving circuit for operating the display unit, power controller and the like. The monitor controls the power supply of the driving circuit according to the occurrence of the external input signal received from the connecting controller 13. The monitor 12 operates the power supplier each time the external input signal is received, to maintain the supply of a voltage to the driving circuit, and simultaneously repeats an operation for setting a time value in the buffer in order to perform a power saving mode. Each time a timer interrupt signal is received, the monitor 12 updates the time value stored in the buffer, and when the time value elapses, it cuts off the power supplied to the driving circuit by controlling the power supplier.

Figure 2:
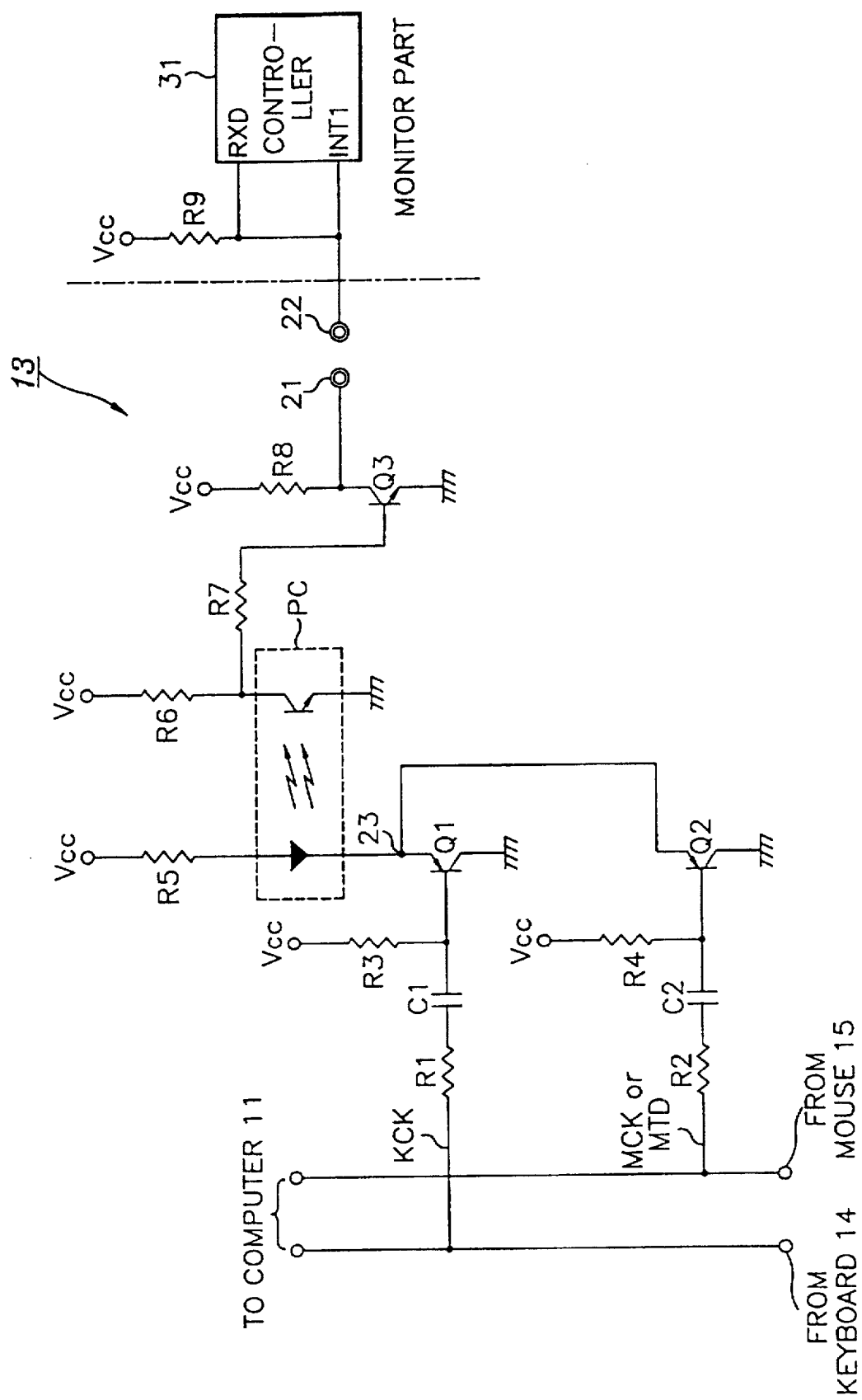
FIG. 2 is a circuit diagram of a connecting controller of FIG.1.

FIG. 2 shows a detailed circuit diagram of the connecting controller 13 shown in FIG. 1. Referring to FIG. 2, a first input signal sensing circuit consists of a first resistor R1, a first capacitor C1, a third resistor R3 and a first transistor Q1. The resistor R1 is serially connected to a key clock signal KCK terminal of the keyboard 14 and performs a current limiting function for reducing the attenuation of the key clock signal KCK. The capacitor C1 is serially connected at one terminal to the resistor R1 and carries out a direct current (DC) coupling function for eliminating a DC level contained in the key clock signal KCK. The resistor R3 is connected between a power terminal Vcc and the other terminal of the capacitor C1 and sets a bias voltage level for driving a switching element. The transistor Q1 of the switching element has its collector grounded and its base connected to the other terminal of the capacitor C1. The transistor Q1 is switched according to the logic state of the key clock signal KCK.

A second input signal sensing circuit consists of a second resistor R2, a second capacitor C2, a fourth resistor R4 and a second transistor Q2. The resistor R2 is serially connected to the mouse clock signal MCK terminal or mouse data MTD terminal of the mouse 15 and performs the current limiting function for reducing the attenuation of the mouse clock signal MCK or the mouse data MTD. In this case, the mouse data MTD may include the transmitting data in the RS-232C type. The capacitor C2 is serially connected at one terminal to the resistor R2 and implements the DC coupling function for eliminating a DC level contained in the mouse clock signal MCK or the mouse data MTD. The resistor R4 is connected between the power terminal Vcc and the other terminal of the capacitor C2 and sets a bias voltage level for driving a switching element. The transistor Q2 of the switching element has its collector grounded and its base connected to the other terminal of the capacitor C2. The transistor Q2 is operated according to the logic state of the mouse clock MCK or the mouse data MTD.

A power supply signal generating circuit consists of a photocoupler PC, fifth to eighth resistors R5–R8 and a third transistor Q3. A light emitting diode of the photocoupler PC has its cathode commonly connected to the emitters of the transistors Q1 and Q2 and its anode connected through the resistor R5 to the power terminal Vcc. A phototransistor of the photocoupler PC has its collector connected through the resistor R6 to the power terminal Vcc and its emitter connected to a ground terminal. The photocoupler PC generates the received external input signal such as the key clock signal KCK, the mouse clock signal MCK or mouse data MTD to a controller 31 of the monitor 12 as the first interrupt signal. Since the photocoupler PC executes an electrical insulating operation during a connecting operation of the external input signal, it performs a space insulating function for preventing a mainboard of the computer 11 from damage by an abnormal voltage within the monitor 12. The resistor R5 is connected between the power terminal Vcc and the anode of the light emitting diode of the photocoupler PC and implements the current limiting function of the light emitting diode. The resistors R6–R8 and the transistor Q3 are connected between the photocoupler PC and a terminal 21, and implement an inverting buffer function for inverting the first interrupt signal. The voltage of the power terminal Vcc is supplied from the keyboard 14 or the mouse 15.

The operation of the circuit of FIG. 2 will now be described. If the connecting controller 13 is not coupled to the controller 31 of the monitor 12, since terminals 21 and 22 are separated, the receiving data terminal RXD and the interrupt terminal INT1 of the controller 31 are at a logic "high" level from the voltage of the power terminal Vcc connected through ninth resistor R9. The controller 31 then recognizes that the connecting controller 13 is in a disconnected state by checking the logic state of the signal received through the receiving data terminal RXD. When the connecting controller 13 is connected to the controller 31 of the monitor 12, if the key clock signal KCK from the keyboard 14, and the mouse clock signal MCK or the mouse data MTD from the mouse 15 are not generated, then the light emitting diode of the photocoupler PC is turned off and also the phototransistor is turned off. Therefore, a logic "high" signal is generated at the collector of the phototransistor, and the transistor Q3 is turned on. Then a logic "low" signal is generated at the collector of the transistor Q3 and the logic "low" signal is applied through the terminals 21 and 22 to the receiving data terminal RXD and the interrupt terminal INT1 of the controller 31. Thus the controller 31 recognizes that the connecting controller 13 is connected to the monitor 12.

For the condition when the connecting controller 13 is connected to the monitor 12, if the key clock signal KCK of a logic "low" level is generated from the keyboard 14, the key clock signal KCK is applied to the base of the transistor Q1 through the resistor R1 and the capacitor C1. Then the transistor Q1 is turned on, and a logic "low" signal is generated at the connecting node 23 on which is the emitter of the transistor Q1, thereby forming a current loop of the light emitting diode of the photocoupler PC. The light emitting diode is turned on and the phototransistor of the photocoupler PC is turned on, with the result that the photocoupler PC produces a logic "low" signal. Hence, the transistor Q3 is turned off and then the first interrupt signal corresponding to the key clock signal KCK is applied to the interrupt terminal INT1 of the controller 31. Thus, the controller 31 recognizes a rising edge signal changing to a logic "high" level from a logic "low" level as the interrupt signal. Therefore, when the key clock signal KCK is generated, the moment the rising edge signal received at the interrupt terminal INT1 is generated, the controller 31 senses the rising edge signal as the first interrupt signal and recognizes that the input signal has been entered. In the same manner, if the mouse clock signal MCK or the mouse data MTD is generated from the mouse 15, the transistor Q2 is turned on and a logic "low" signal is generated at the connecting node 23. Thus the controller 31 senses the first interrupt signal and recognizes that the input signal has been entered.

Figure 4:
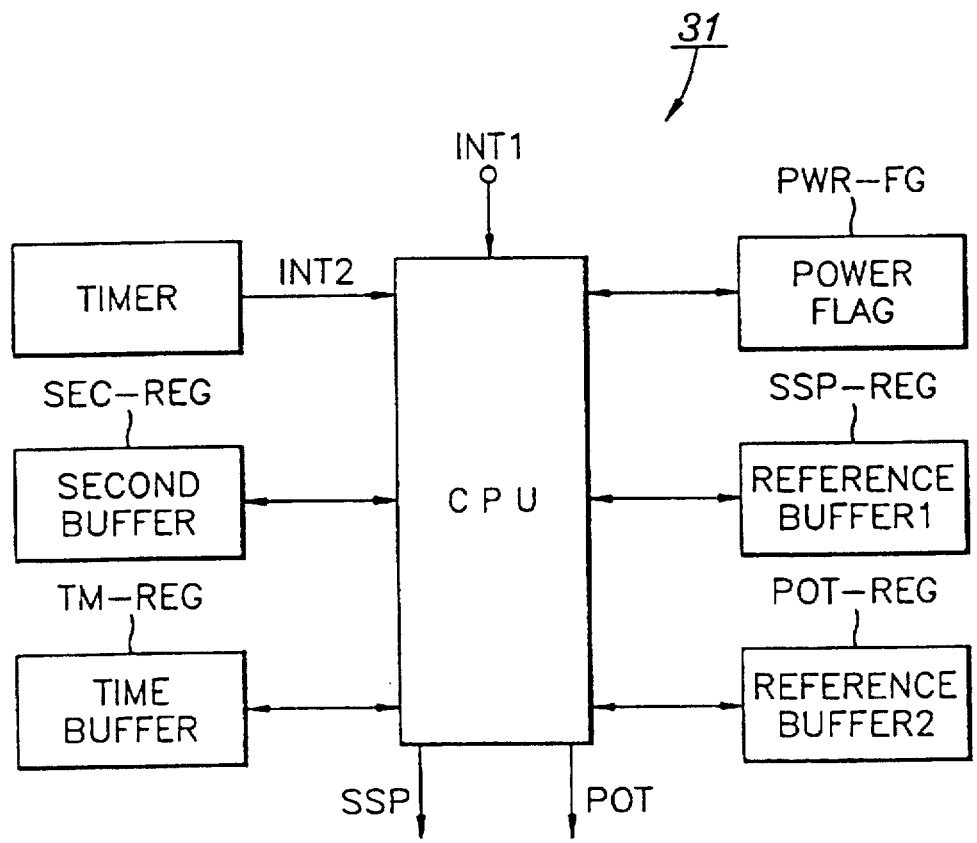
FIG. 4 is a block diagram showing the internal configuration of the controller of FIG. 3.
Figure 3:
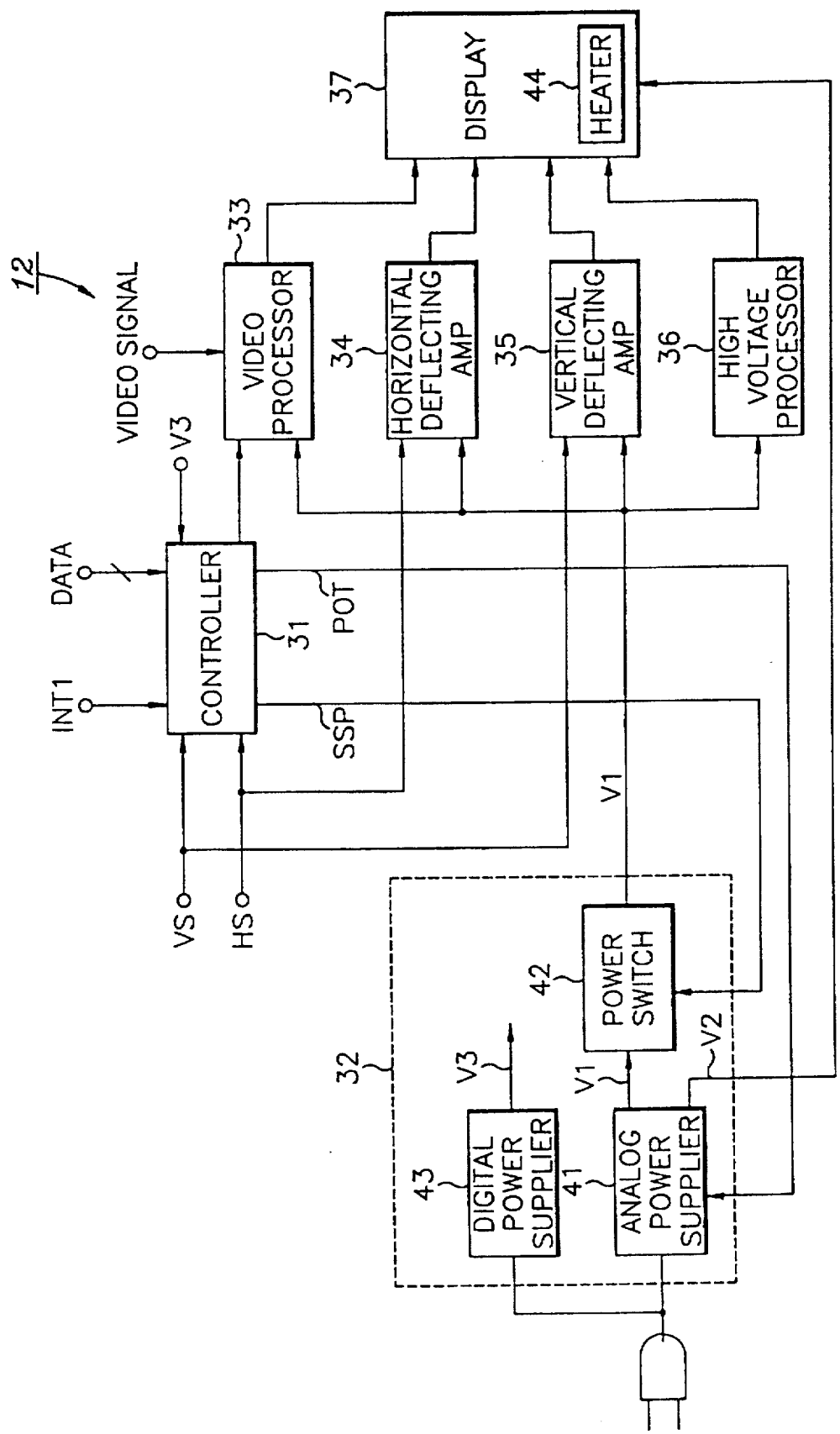
FIG. 3 is a block diagram of a monitor of FIG. 1.

FIG. 3 shows the internal configuration of the monitor 12 of FIG. 1. The controller 31 is a microcontroller which is capable of performing a timer interrupt function and has a memory, such as a RAM (Random Access Memory) and a ROM (Read Only Memory), therein. FIG. 4 represents the internal configuration of the controller 31 of FIG. 3. The controller 31 may use a 8051 or 8052 series chip available from Intel, Co., U.S. In the RAM of the controller 31, a first reference buffer SSP-REG, a second reference buffer POT-REG, a time buffer TM-REG and a power flag PWR-FG are included to perform a power saving function of the monitor 12. Also, a second buffer SEC-REG is included to process a second interrupt signal to update time values set in the first and second reference buffers SSP-REG and POT-REG. A timer connected to a CPU (Central Processing Unit) generates a second interrupt signal.

The CPU in the controller 31 receives the first interrupt signal from the connecting controller 13 and also receives vertical and horizontal synchronizing signals from the computer 11. When the first interrupt signal is received, the CPU generates power control signals so that power may be transmitted to a first power control port SSP and a second power control port POT, and simultaneously sets reference time values in the first and second reference buffers SSP-REG and POT-REG to control the supply of power to the monitor 12. When the second interrupt signal is received from the timer, the CPU decreases the time values set in the first and second reference buffers SSP-REG and POT-REG. Therefore, if the first interrupt signal is generated before the time value set in the reference buffer reaches 0, the CPU maintains the state for generating the power control signals to supply power to the monitor 12, and at the same time, the time values are again set in the first and second reference buffers SSP-REG and POT-REG. However, if the first interrupt signal is not generated until after the time value of the reference buffer reaches 0, the CPU generates the power control signals for cutting off the power to the first and second power control ports SSP and POT.

Again referring to FIG. 3, a power circuit 32 consists of an analog power supplier 41, a power switch 42 and a digital power supplier 43. The analog power supplier 41 and the digital power supplier 43 are connected to an indoor power supplier, respectively. The analog power supplier 41 generates first and second voltages V1 and V2, and the digital power supplier 43 generates third voltage V3. The power circuit 32 may use a switching mode power supply. The analog power supplier 41 generates the first and second voltages V1 and V2 by rectifying and regulating alternating current (AC) power. The first and second voltages V2 and V2 are controlled by the output of a second power control signal generated through the second power control port POT of the CPU in the controller 31. The first and second voltages V1 and V2, which are the outputs of the analog power supplier 41, are supplied to each part of the monitor 12, except the controller 31. The first voltage V1 is a high voltage for driving each part of the monitor 12, and the second voltage V2 is used in order to drive a heater 44 of a display unit 37. The power switch 42 is connected to the first voltage V1 terminal of the analog power supplier 41 and controls the supply of the first voltage V2 according to the output of a first power control signal generated through the first power control port SSP of the controller 31. The digital power supplier 43 generates the third voltage V3 by rectifying and regulating the AC power. The third voltage V3 is supplied as the operating voltage to the controller 31, and therefore, the uniform power is supplied to the controller 31 regardless of the power saving mode of the monitor 12. Thus, the controller 31 is operated irrespective of the presence/absence of the input signal. However, without the digital power supplier 43, the power circuit 32 may be designed so that the analog power supplier 41 generates the third voltage V3 and the third voltage V3 is supplied irrespective of the state of the second power control signal.

A driving circuit includes a video processor 33, a horizontal deflecting amplifier 34, a vertical deflecting amplifier 35 and a high voltage processor 36. The display unit 37 is connected to the output terminals of the driving circuit and displays a video signal on a display screen. The video processor 33 controlled by the controller 31 receives the video signal from the computer 11 and receives the first voltage V1 as the operating voltage from the power circuit 32. The video processor 33 has an on-screen display function and amplifies the received video signal, to provide the amplified signal to the display unit 37. The horizontal deflecting amplifier 34 receives the horizontal synchronizing signal HS and receives the first voltage V2 generated from the power switch 42 as the operating voltage. The horizontal deflecting amplifier 34 is in charge of the horizontal deflection of the display unit 37 by amplifying the received horizontal synchronizing signal. The vertical deflecting amplifier 35 receives the vertical synchronizing signal VS and the first voltage V1 generated from the power switch 42 as the operating voltage. The vertical deflecting amplifier 35 is in charge of the vertical deflection of the display unit 37 by amplifying the received vertical synchronizing signal. The high voltage processor 36 receives the first voltage V2 from the power switch 42 and drives a flyback transformer positioned in the display unit 37.

The display unit 37 is a CRT well-known in the art and receives the second voltage V2 generated from the analog power supplier 41 to heat the heater 44. The display unit 37 also receives the power generated from the high voltage processor 36 as the operating voltage. The display unit 37 deflects the video signal in response to the outputs of the horizontal deflecting amplifier 34 and the vertical deflecting amplifier 35, and displays the video signal received from the video processor 33 on the display screen.

The operation of FIGS. 3 and 4 will now be described. If the first interrupt signal is sensed, the controller 31 generates signals for supplying the operating voltage to the first and second power control ports SSP and POT and simultaneously sets the prescribed time values for performing first and second power saving modes in the first and second reference buffers SSP-REG and POT-REG. The time value of the first power saving mode set in the first reference buffer SSP-REG is less than that of the second power saving mode set in the second reference buffer POT-REG. That is, the power of the monitor 12 is effectively controlled by sequentially cutting off the supply of power. If the second interrupt signal is generated by the timer, the controller 31 decrements the time values stored in the first and second reference buffers SSP-REG and POT-REG. It will be appreciated that if the first interrupt signal is not generated, the time values stored in the first and second reference buffers SSP-REG and POT-REG are decremented. If the first interrupt signal is received before the time values stored in the first and second reference buffers SSP-REG and POT-REG become "0", the controller 31 maintains the signal for respectively supplying the first and second voltages V1 and V2 to the first and second power control ports SSP and POT and simultaneously resets the prescribed time values of the first and second power saving modes in the first and second reference buffers SSP-REG and POT-REG. However, if the first interrupt signal is not generated until the time values stored in the first and second reference buffers SSP-REG and POT-REG become "0", the controller 31 generates the first and second power control signals for cutting off the power supplied to the first and second power control ports SSP and POT. In this case, the time value of the first power saving mode set in the first reference buffer SSP-REG is less than that of the second power saving mode set in the second reference buffer POT-REG. Therefore, when implementing the power saving mode, the controller 31 generates the first power control signal from the first power control port SSP for cutting off the supply of the first voltage V1, and thereafter generates the second power control signal from the second power control port POT for stopping the operation of the analog power supplier 41.

The power circuit 32 connected to the first and second power control ports SSP and POT of the controller 31 controls the power in response to the signal received from these ports. If the first power control signal is received through the first power control port SSP, the power switch 42 is off-switched, to cut off the path of the first voltage V1 applied to the video processor 33, the horizontal deflecting amplifier 34, the vertical deflecting amplifier 35 and the high voltage processor 36 which are the driving circuit of the monitor 12. In this case, if the second power control signal is not generated, since the second voltage V2 generated from the analog power supplier 41 is still supplied to the heater 44, the display unit 37 maintains a standby state. Thereafter, if the second power control signal is generated through the second power control port POT, the analog power supplier 41 does not generate the first and second voltages V1 and V2. Then since the operating voltage of the monitor 12 is cut off, the monitor 12 stops a display function. That is, if the input signal is not entered during the preset time, since the monitor 12 cuts off the operating power, voltage is not consumed. At the same time, since an unnecessary display operation is not performed, the life of the monitor increases.

Under such a power saving mode, since the controller 31 senses whether or not the external input signal is received, the digital power supplier 43 should maintain an operating state regardless of the power saving mode. Therefore, the controller 31 receives the third voltage V3 from the digital power supplier 43 even during the power saving mode. If the first interrupt signal is received, the controller 31 releases the power saving mode of the monitor 12 and changes to a normal mode. For the condition when the power saving mode is performed, if the external input signal is generated, since the controller 31 senses the external input signal as the first interrupt signal, the controller 31 clears the first and second power control ports SSP and POT and simultaneously resets the time values of the first and second power saving modes stored in the first and second reference buffers SSP-REG and POT-REG. Hence the power circuit 32 supplies the operating voltage to each driving circuit. Then the image data which have disappeared is redisplayed on the display unit 37.

As described above, the analog power supplier 41 generates the first and second voltages V1 and V2 as operating voltage of the monitor 12. The first voltage V1 is the only power source to be supplied to the video processor 33, the horizontal deflecting amplifier 34, the vertical deflecting amplifier 35 and the high voltage processor 36 and may have a value of 8V, 12V, 16V, 25V, 85V, 200V, etc. The second voltage V2 is the power source for operating the heater 44 of the display unit 37 and may have a value of 6V.

The power saving apparatus of the monitor controls the power sequentially. However, if the first and second reference buffers SSP-REG and POT-REG are replaced with one reference buffer and the first and second power control ports SSP and POT are replaced with one power control port, power can be controlled in a binary manner, rather than sequentially.

Figure 5:
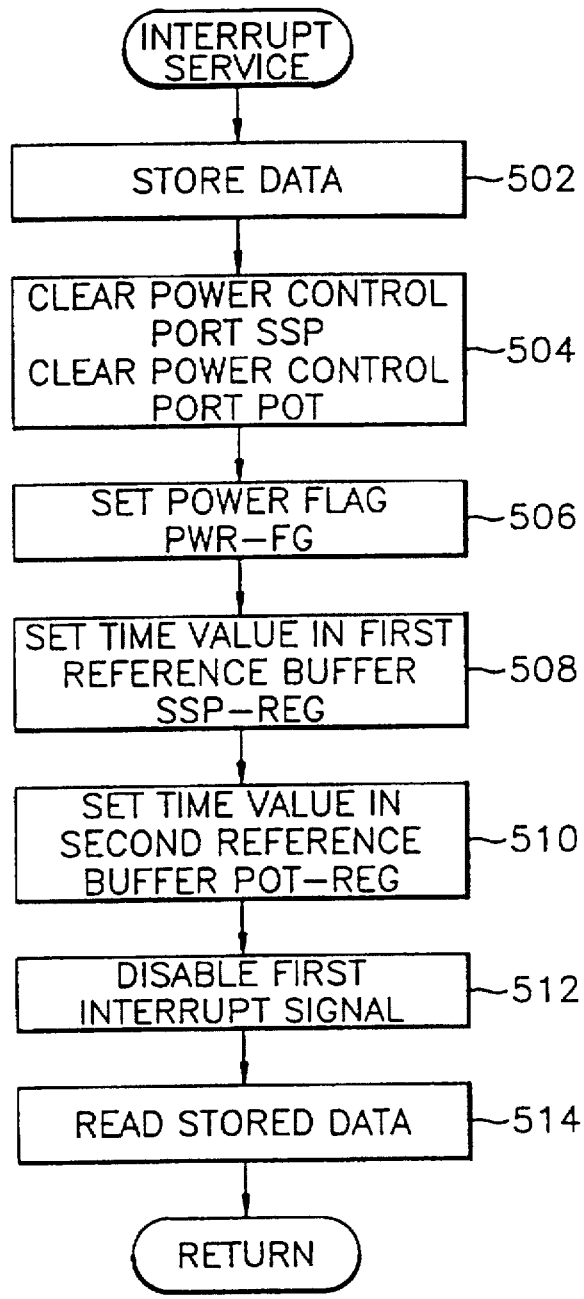
FIG. 5 is a flowchart showing a first interrupt service routine according to the preferred embodiment of the present invention.

FIG. 5 shows a first interrupt service routine executed when the controller 31 of the monitor 12 senses the first interrupt signal. If the first interrupt signal is sensed, the controller 31 stores data being processed, at step 502. At step 504 the first and second power control ports SSP and POT are cleared, and at step 506 the power flag PWR-FG is set. At step 508 a first reference time value is set in the first reference buffer SSP-REG, and at step 510 a second reference time value is set in the second reference buffer POT-REG. At step 512 the first interrupt signal is disabled. At step 514 the controller 31 reads the stored data and returns to a main program routine of FIG. 7.

To clear the first and second power control ports SSP and POT represents that the signals for operating the power switch 42 and the analog power supplier 41 are generated. To set the first and second power control ports SSP and POT means that the first and second power control signals for stopping operation of the power switch 42 and the analog power supplier 41 are generated. To set the power flag PWR-FG means a power supply state is established and the clear state of the power flag PWR-FG indicates that the power saving mode is performed by cutting off the supply of the first and second voltages.

The operation of the first interrupt service routine will now be described with reference to FIG. 5. If any input signal is generated from the keyboard 14 or the mouse 15, the connecting controller 13 is triggered by the variation of the received input signal, and the controller 31 of the monitor 12 receives the edge variation received from an output terminal of the connecting controller 13 as the first interrupt signal. If the first interrupt signal is received, the controller 31 stores, at step 502, the data being processed and then adjusts the state of buffers, a flag and the like for executing the power saving mode.

At step 504, the controller 31 releases the power saving mode and changes to the normal mode by clearing the first and second power control ports SSP and POT. The normal mode means that the first and second voltages V1 and V2 are supplied, to normally operate the analog power supplier 41 and the power switch 42. Therefore, if the first interrupt signal is received, the controller 31 controls the power circuit 32, by clearing the first and second power control ports SSP and POT, so that the first and second voltages V1 and V2 may be supplied to each driving circuit of the monitor 12. If the first and second power control ports SSP and POT are cleared, the signals for turning on the power are generated to perform the normal mode. If the first and second power control ports SSP and POT are set, the first and second power control signals are generated to perform the power saving mode. Therefore, if the previous state is the power saving mode, the operating voltage is supplied to each driving circuit of the monitor 12, and if the previous mode is the normal mode, the supply state of the operating voltage is maintained. In order to indicate the current state is not the power saving mode, the controller 31 sets, at step 506, the power flag PWR-FG.

At steps 508 and 510, the controller 31 sets the time values in the first and second reference buffers SSP-REG and POT-REG in order to implement the first and second power saving modes. That is, the time value for implementing the first power saving mode is set in the first reference buffer SSP-REG, and the time value for performing the second power saving mode is set in the second reference buffer POT-REG. The time values can be set by use of the values of the time buffer TM-REG. It is assumed that the time value of the first power saving mode set in the first reference buffer SSP-REG is half the time value registered in the time buffer TM-REG, and the time value of the second power saving mode set in the second reference buffer POT-REG is set to the value of the time buffer TM-REG. In the present embodiment, the time value of the second power saving mode set in the second reference buffer POT-REG is twice the time value of the first power saving mode set in the first reference buffer SSP-REG. If necessary, the time values set in the first and second reference buffers SSP-REG and POT-REG may be varied and thus the periods of the first and second power saving modes varied.

After the time values are set, the controller 31 disables, at step 512, the first interrupt signal in order to prevent an unnecessary interrupt service operation caused by the successive occurrence of the first interrupt signal and reads, at step 514, the stored data to execute corresponding work.

Therefore, if the external input signal is received from the keyboard 14 or the mouse 15, the connecting controller 13 generates the first interrupt signal and the controller 31 of the monitor 12 sequentially executes the aforementioned operations for setting the various reference values necessary to perform the power saving mode. If the state prior to the occurrence of the first interrupt signal is the power saving mode, the controller 31 generates the signals for turning on the power through the first and second power control ports SSP and POT and again sets the time values set in the first and second reference buffers SSP-REG and POT-REG. If the previous state is the normal mode, the controller 31 maintains the power supply state by continuously maintaining the signals generated through the first and second power control ports SSP and POT and again sets the time values set in the first and second reference buffers SSP-REG and POT-REG. Therefore, if the external input signal is generated before the set time elapses, the monitor 12 executes the normal mode and performs normal display operation. If the external input signal is not generated until after the set time elapses, the monitor 12 stops the supply of operating voltage by sequentially performing the first and second power saving modes.

Figure 6:
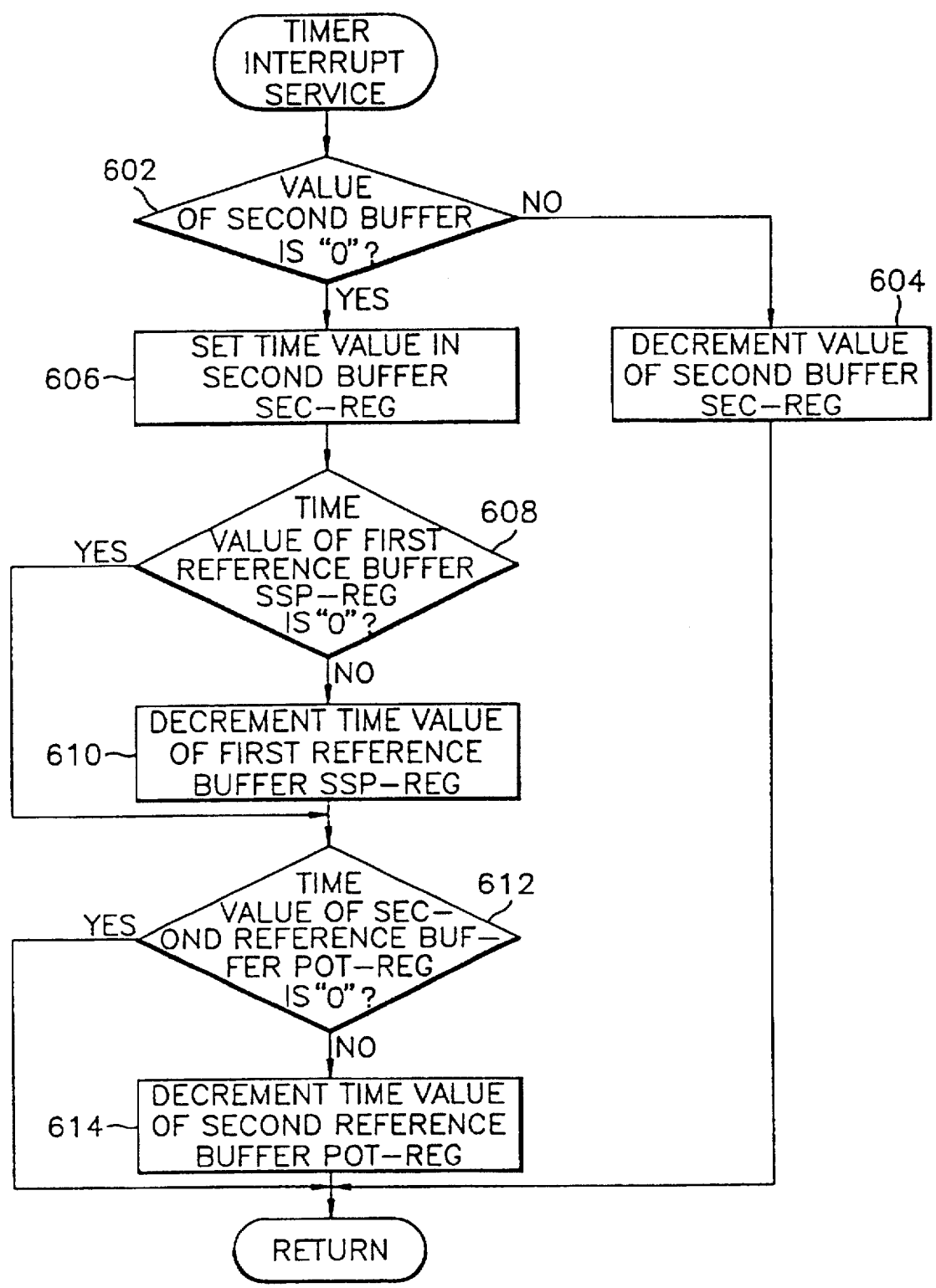
FIG. 6 is a flowchart showing a second interrupt service routine according to the preferred embodiment of the present invention.

FIG. 6 shows a second interrupt service routine performed when the controller 31 of the monitor 12 senses the timer interrupt signal. If the second interrupt signal INT2 is sensed from the timer, the controller 31 checks whether or not the value of the second buffer SEC-REG is 0 at step 602. If it is not 0, the value of the second buffer SEC-REG is decremented by 1 at step 604. If it is 0, the time value is set in the second buffer SEC-REG at step 606. At step 608, it is judged whether or not the time value of the first reference buffer SSP-REG is 0. If it is 0, step 608 advances to step 612, and otherwise, the time value of the first reference buffer SSP-REG is decremented at step 610. At step 612, the time value of the second reference buffer POT-REG is checked to see if it is 0. If yes, then step 612 returns to the main routine and otherwise, the time value of the second reference buffer POT-REG is decremented at step 614.

The operation of the second interrupt service routine will now be explained with reference to FIG. 6. The time values of the first and second power saving modes set in the first and second reference buffers SSP-REG and POT-REG by the first interrupt signal are decremented by the timer interrupt signal. It is assumed that the second interrupt signal INT2 is periodically generated by the timer every 1 ms. By using the second buffer SEC-REG, the time values of the first and second reference buffers SSP-REG and POT-REG are decremented. Because a second is 1000 milliseconds (ms), the value of the second buffer SEC-REG is set to 1000. The period of the timer interrupt signal may be varied.

If the second interrupt signal INT2 is generated, the controller 31 examines, at step 602, the value of the second buffer SEC-REG. If the value of the second buffer SEC-REG is not 0, the value of the second buffer SEC-REG is decremented by 1 at step 604. If the value of the second buffer SEC-REG is 0, the value 1000 is set in the second buffer SEC-REG to start the count operation. Although the time count by a down-count operation is used in the above description, a up-count operation may be practiced.

If the value of the second buffer SEC-REG is 0, the controller 31 recognizes that one second has elapsed, and at step 608, the controller 31 checks the time value of the first reference buffer SSP-REG. If the time value of the first reference buffer SSP-REG is 0, step 608 continues at step 612. This state indicates that the first power saving mode is being performed. If the time value of the first reference buffer SSP-REG is not 0, it is decremented by a second at step 610. After updating the time value of the first reference buffer SSP-REG, the controller 31 determines, at step 612, the time value of the second reference buffer POT-REG. If it is 0, step 612 returns to the main routine and this state represents that the second power saving mode is being implemented. If the time value of the second reference buffer POT-REG is not 0, it is decremented by 1 at step 614. The process for updating the time values of the first and second reference buffers SSP-REG and POT-REG may also be practiced with the up-count operation instead of the down-count operation.

Therefore, if the second interrupt signal INT2 is generated, the controller 31 updates the time values of the first and second reference buffers SSP-REG and POT-REG set by the first interrupt signal. If input signal is not received until after the set time elapses, the time values of the first and second reference buffers SSP-REG and POT-REG become 0 and this means that it is time to perform the power saving mode of the monitor 12.

Figure 7:
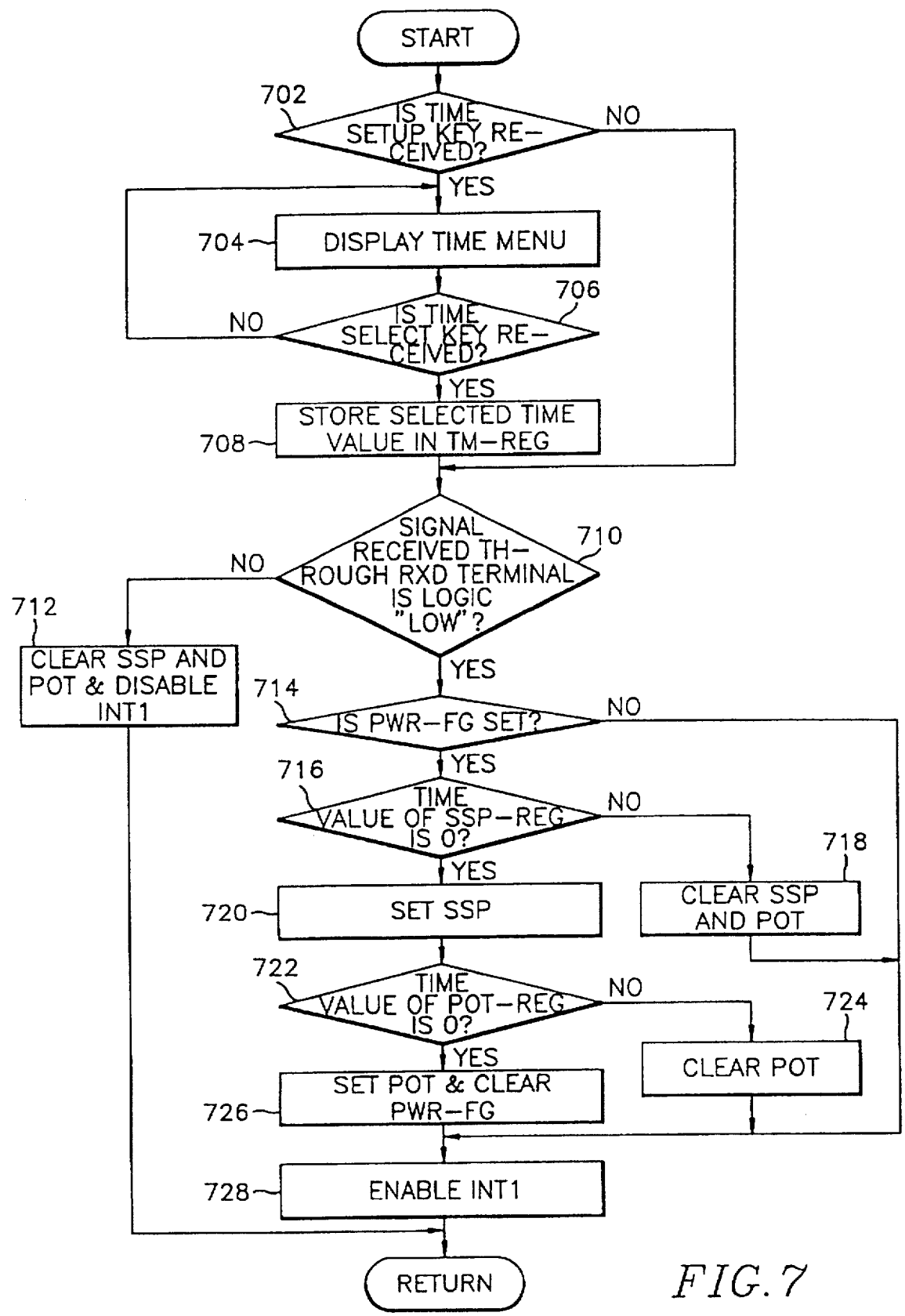
FIG. 7 is a flowchart showing a power saving method of a monitor according to the preferred embodiment of the present invention.

FIG. 7 shows the procedure for saving the power of the monitor 12 by controlling the power circuit 32. The flow-chart of FIG. 7 is a main routine implemented when the first and second interrupt signals are not generated. At step 702, the controller 31 of the monitor 12 examines whether or not a time setup key is received. If the time setup key is received, a time menu is displayed by use of the on-screen function at step 704. Otherwise, step 702 is succeeded by step 710. At step 706, a time select key is checked to see if it is received. If so, a selected time value is stored in the time buffer TM-REG at step 708, and if it is not received, step 706 returns back to step 704. At step 710, it is judged whether or not a signal received through the receiving terminal RXD of the controller 31 is logic "low". If the signal is logic "high", the first and second power control ports SSP and POT are cleared and the first interrupt signal is disabled at step 712. If the signal is logic "low", the state of the power flag PWR-FG is checked at step 714. If the power flag PWR-FG is in a reset state, step 714 is followed by step 728, and if it is in a set state, the controller 31 examines whether or not the time value of the first reference buffer SSP-REG is 0. If the time value of the first reference buffer SSP-REG is not 0, the first and second power control ports SSP and POT are cleared at step 718, and if it is 0, the first power control port SSP is set at step 720. At step 722, the time value of the second reference buffer POT-REG is checked. If the time value of the second reference buffer POT-REG is not 0, the second power control port POT is cleared at step 724. If it is 0, the second power control port POT is set and the power flag PWR-FG is cleared at step 726. At step 728, the first interrupt signal of the interrupt terminal INT1 is enabled.

The operation of the main routine will now be described with reference to FIG. 7. In the main routine, an operation for selecting and storing the time value of the time buffer TM-REG, and a decision whether or not the power saving mode is performed by checking the state of the first and second reference buffers SSP-REG and POT-REG are executed. At step 702, the controller 31 checks whether or not a time setup key is received. If the time setup key is not received, step 702 proceeds to step 710, and if it is received, a time menu is displayed by controlling the video processor 33 at step 704. The time menu may be variably determined. It is assumed that the time menu is set by the unit of 5 minutes (for example, 5, 10, 15 . . . , 60). At step 706, the controller 31 checks whether or not a time select key is received. The time select key may use an up/down key. If time value is selected by the time select key, the selected time value is stored in the time buffer TM-REG at step 708. The time buffer TM-REG is used for setting the first and second reference buffers SSP-REG and POT-REG of the first interrupt service routine shown in FIG. 5. Therefore, it will be appreciated that the time period for deciding the period of the power saving mode is determined by the time value of the time buffer TM-REG and the time values set in the first and second reference buffers SSP-REG and POT-REG, and this time period is variably determined. The time setup key and the time select key may be received from the computer 11 or the monitor 12 may have additional input means.

In a method for registering the time value in the time buffer TM-REG, a user may directly set the time value without using the time menu. That is, when sequentially entering the time setup key, a numeric key for setting the time value and a time register key from the input means, the controller 31 of the monitor 12 can store the time value in the time buffer TM-REG.

After storing the time value in the time buffer TM-REG, or if the time setup key is not yet received, the controller 31 examines the signal received through the receiving data terminal RXD at step 710 in order to see if the controller 31 is connected to the output terminal of the connecting controller 13. If the connecting controller 13 is not connected to the controller 31, since the terminals 21 and 22 are separated, the receiving data terminal RXD and the input terminal of the controller 31 are in a floating state and thus the controller 31 senses this state as a logic "high" level. Under the condition when the connecting controller 13 is connected to the controller 31, if the external input signal is not generated, since the terminals 21 and 22 are connected, the transistor Q3 is turned on and a logic "low" signal is generated at the collector of the transistor Q3. Thus, under the condition when the terminals 21 and 22 are connected, if the external input signal is generated, the transistor Q1 or Q2 is switched and then the logic state of the connecting node 23 is varied. Therefore, since the photocoupler PC and the transistor Q3 are switched, the controller 31 receives a trigger signal through the interrupt terminal and senses the trigger signal as the first interrupt signal INT1. Thus, if the controller 31 receives a logic "high" signal through the receiving data terminal RXD, the first and second power control ports SSP and POT are cleared and the first interrupt signal INT1 is disabled at step 712. In this case, the receiving data terminal RXD connects the monitor 12 to a control box and is used as a terminal for implementing another function through an input/output portion. Hence, at step 712 the input/output portion is enabled.

If the receiving data terminal RXD of the controller 31 is logic "low" at step 710, since the connecting controller 13 is in a connected state, the state of the power flag PWR-FG is checked at step 714. If the power flag PWR-FG is in a cleared state, since the power saving mode is being performed, step 714 advances to step 728. In order words, if the power flag PWR-FG is in a cleared state, the controller 31 generates the first and second power control signals for cutting off the supply of the operating voltages by setting the first and second power control ports SSP and POT. Then the power switch 42 is turned off and the operation of the analog power supplier 41 is stopped. Therefore, the first and second voltages V1 and V2 are not supplied. As a result, the operation of the driving circuit of the monitor 12 is stopped and the display unit 37 does not perform the screen display function.

At step 714, if the power flag PWR-FG is in a set state, a current state becomes the normal mode or the first power saving mode. Then the controller 31 examines the time value of the first reference buffer SSP-REG at step 716. If the time value of the first reference buffer SSP-REG is not 0, the controller 31 clears the first and second power control ports SSP and POT to operate the monitor 12 in the normal mode at step 718. In the normal mode, since the analog power supplier 41 is operated and the power switch 42 maintains an on-state, the first and second voltages V1 and V2 are supplied to the driving circuit of the monitor 12 and the heater 44 of the display unit 37. Therefore, the driving circuit performs a corresponding function under the control of the controller 31 and the display unit 37 displays the received video signal on the display screen.

At step 716, if the time value of the first reference buffer SSP-REG is 0, the controller 31 sets the first power control port SSP to execute the first power saving mode at step 720. When the first power control port SSP is set, the power switch 42 is off-switched and the first voltage V1 generated from the analog power supplier 41 is cut off. Then the video processor 33, horizontal deflecting amplifier 34, vertical deflecting amplifier 35 and high voltage processor 36 are not operated and the display unit 37 does not display the video signal. However, since the second voltage V2 generated from the analog power supplier 41 is supplied to the heater 44 of the display unit 37, the heater 44 is operated. The reason why the heater 44 is operated in the first power saving mode is to rapidly operate the monitor 12 when the external input signal is received.

At step 722, the controller 31 monitors the time value of the second reference buffer POT-REG. If it is not 0, the second power control port POT is cleared at step 724. In this case, the controller 31 sets the first power control port SSP and clears the second power control port POT. When performing the first power saving mode, under the condition that the first voltage V1 is not supplied, the second voltage V2 for driving the heater 44 of the display unit 37 is supplied and thereafter the controller 31 checks whether or not the external input signal is generated and whether the set time of the second power saving mode has elapsed.

At step 722, if the time value of the second reference buffer POT-REG is 0, the controller 31 sets the second power control port POT to generate the second power control signal and simultaneously clears the power flag PWR-FG at step 726. This state means that the second power saving mode is implemented. In the second power saving mode, the first and second power control signals are generated by setting the first and second power control ports SSP and POT and simultaneously the power flag PWR-FG is cleared. Then the power switch 42 maintains the off state and the first and second voltages V1 and V2 are not generated from the analog power supplier 41. Since the controller 31 should check whether or not the first interrupt signal is generated through the interrupt terminal, the controller 31 should receive the operating voltage regardless of the power saving mode. That is, the third voltage V3, which is the output of the digital power supplier 43, is supplied to the controller 31. Thus the controller 31 senses the external input signal even though the second power saving mode is executed. If the second power saving mode is executed, since the operating voltages are not supplied to the monitor 12, the display operation is stopped.

As previously mentioned, if the second power saving mode is performed, the controller 31 clears the power flag PWR-FG. That is, since the monitor 12 changes to the power saving mode and the analog power supplier 41 does not generate the power voltages, the saving mode is not released before the external input signal is received. Therefore, under the condition when the second power saving mode is implemented, if the external input signal is not received, the controller 31 recognizes that the power flag PWR-FG is in a cleared state. Hence the controller 31 maintains the state of the second power saving mode by continuously setting the first and second power control ports SSP and POT. In the second power saving mode, if the first interrupt signal INT1 is generated, the controller 31 executes the first interrupt service routine shown in FIG. 5 and the releases the power saving mode.

After checking the time values of the first and second reference buffers SSP-REG and POT-REG, the controller 31 enables the first interrupt signal at step 728, to examine whether or not the input signal is generated from the keyboard 14 or the mouse 15.

In the foregoing described embodiments, the power saving mode is sequentially performed by use of multiple reference buffers and power control ports. However, one reference buffer and one power control port may also be utilized.

Moreover, the power of the monitor is saved by determining whether or not the input signal is received within the set time. However, if the computer checks whether or not the input signal is received within the set time and transmits the result to the monitor through the horizontal and vertical synchronizing signals, the monitor may analyze the result and control the operating voltage of the monitor, to practice the power saving method.

Further, if a sensor which is capable of sensing the motion of the user is installed on the front part of the computer or the monitor, the power of the monitor may be saved by sensing a time period while the user leaves his or her seat.

As described above, when the user operates a computer, if the user leaves his or her seat or the input signal is not generated for a long time, the power of the monitor is automatically cut off. Therefore, the power consumption of the monitor can be greatly reduced. For example, the power consumption is about 70–80 W, 100 W and 130–140 W in the case of 14, 17 and 21-inch monitors, respectively. If the power supplied to the monitor is cut off when the monitor is not used, about 80–90% of such power can be saved.

While the invention has been shown and described with reference to the preferred embodiment thereof, it will be understood by those skilled in the art that foregoing and other changes in form and details may be made without departing from the spirit and scope of the present invention.

What is claimed is:

1. A power saving apparatus of a monitor, comprising:
   input means for generating external input signals in response to user inputs;
   power supply signal generating means connected between a computer and said input means, for providing said external input signals from said input means to said computer, and generating a power supply signal in direct response reception of to one of said external input signals; and
   power control means connected to said power supply signal generating means, for responding solely to a timing operation and a lack of generation of said power supply signal to execute a power saving function by sequentially cutting off a supply of first and second operating voltages to said monitor when said power supply signal is not received for first and second predetermined time periods, respectively.

2. The power saving apparatus as claimed in claim 1, wherein said power control means comprises:
   power means for generating the first and second operating voltages;
   reference buffer means for storing values representative of said first and second predetermined time periods, said first and second predetermined time periods indicative of times for activating first and second power saving modes of said monitor, respectively; and control means connected to said power supply signal generating means, for sequentially cutting off said first and second operating voltages when said power supply signal is not received until after said first and second predetermined time periods of said reference buffer means elapse, respectively, and for supplying said first and second operating voltages to said monitor when said power supply signal is received before said first and second predetermined time periods elapse, respectively.

3. The power saving apparatus as claimed in claim 2, wherein said power means comprises:

power generating means for generating said first and second operating voltages of said monitor; and power switch means connected to said power generating means, for switching said first operating voltage in response to an output signal of said control means.

4. The power saving apparatus as claimed in claim 3, wherein said input means comprises:

a keyboard for generating a key clock signal as a first external input signal; and a mouse for generating one of a mouse clock signal and mouse data as a second external input signal.

5. The power saving apparatus as claimed in claim 4, wherein said power supply signal generating means comprises:

means connected to said keyboard, for sensing said first external input signal in response to said key clock signal;

means connected to said mouse, for sensing said second external input signal in response to one of said mouse clock signal and said mouse data; and means connected to receive said first and second external input signals, having a photocoupling device, for generating said power supply signal in response to one of said first and second external input signals and providing said power supply signal to said power control means.

6. The power saving apparatus as claimed in claim 1, further comprised of said first and second predetermined time periods being adjustable according to user inputs via manual activation of said input means by the user.

7. A power saving apparatus of a monitor, comprising:

input means for generating external input signals in response to user inputs;

power supply signal generating means connected between a computer and said input means for providing said external input signals from said input means to said computer, said power supply signal generating means generating a power supply signal in response reception of to one of said external input signals;

timer interrupt means for periodically generating a timer interrupt signal according to predetermined equal time periods;

driving means for driving said monitor in response to operating voltages;

power means connected to said driving means, for providing and cutting off said operating voltages to said driving means;

memory means for storing a reference time value indicative of a time for performing a power saving mode; and control means for controlling said power means to provide said operating voltages to said driving means and simultaneously setting the reference time value in said memory means by responding solely to generation of said power supply signal, said control means enabling performance of a timing operation by updating said reference time value stored in said memory means in response to said timer interrupt signal, and responding solely to said timing operation and a lack of generation of said power supply signal to perform said power saving mode by driving said power means to cut-off said operating voltages supplied to said driving means when said reference time value stored in said memory means reaches a preset time value before said power supply signal is generated.

8. The power saving apparatus as claimed in claim 7, wherein said power means comprises:

power generating means for generating said operating voltages of said monitor; and power switch means connected between said power generating means and said driving means of said monitor, for switching one of the operating voltages in response to a power control signal provided from said control means.

9. The power saving apparatus as claimed in claim 8, wherein said input means comprises:

a keyboard for generating a key clock signal as a first external input signal; and a mouse for generating one of a mouse clock signal and mouse data as a second external input signal.

10. The power saving apparatus as claimed in claim 9, wherein said power supply signal generating means comprises:

means connected to said keyboard, for sensing said first external input signal in response to said key clock signal;

means connected to said mouse, for sensing said second external input signal in response to one of said mouse clock signal and said mouse data; and means connected to receive said first and second external input signals, having a photocoupling device, for generating said power supply signal in response to one of said first and second external input signals.

11. The power saving apparatus as claimed in claim 7, further comprised of said reference time value being adjustable according to user inputs via manual activation of said input means by the user.

12. A power saving apparatus of a monitor, comprising:

input means for generating external input signals in response to user inputs;

power supply signal generating means connected between a computer and said input means, for providing said external input signals from said input means to said computer, said power supply signal generating means generating a first interrupt signal in response to one of said external input signals;

timer interrupt means for periodically generating a second interrupt signal according to predetermined equal time periods;

driving means for driving said monitor in response to first and second operating voltages;

power means connected to said driving means, for switching the first and second operating voltages in response to first and second power control signals, respectively, said first and second power control signals generated through first and second power control ports, respectively;

memory means for storing first and second reference time values indicative of times for performing first and second power saving modes, respectively;

control means for controlling said power means to provide said first and second operating voltages to said driving means and simultaneously setting said first and second reference time values in said memory means by responding to receipt of said first interrupt signal, said control means enabling performance of a timing operation by updating said first and second reference time values stored in said memory means when said second interrupt signal is received, checking said first and second reference time values in said memory means, and responding solely to said timing operation and a lack of generation of said first interrupt signal to perform said first and second power saving modes by sequentially generating said first and second power control signals to control said power means when said times indicated by said first and second reference time values elapse, respectively.

13. The power saving apparatus as claimed in claim 12, wherein said power means comprises:

first power generating means for generating said first operating voltage to drive said monitor and said second operating voltage to drive a heater in the monitor, by rectifying and regulating a supply voltage, and cutting off said first and second operating voltages when said second power control signal is received from said control means;

power switch means connected between said first power generating means and said driving means of said monitor, for cutting off said first operating voltage when said first power control signal is received from said control means; and second power generating means for generating a third operating voltage to be supplied to said control means by rectifying and regulating the supply voltage.

14. The power saving apparatus as claimed in claim 13, wherein said input means comprises:

a keyboard for generating a key clock signal as a first external input signal; and a mouse for generating one of a mouse clock signal and mouse data as a second external input signal.

15. The power saving apparatus as claimed in claim 14, wherein said power supply signal generating means comprises:

means connected to said keyboard, for sensing said first external input signal in response to said key clock signal;

means connected to said mouse, for sensing said second external input signal in response to one of said mouse clock signal and said mouse data; and means connected to receive said first and second external input signals, having a photocoupling device, for generating said first interrupt signal in response to one of said first and second external input signals, to provide said first interrupt signal to said power control means.

16. The power saving apparatus as claimed in claim 13, wherein said second reference time value of said second power saving mode is twice said first reference time value of said first power saving mode.

17. The power saving apparatus as claimed in claim 12, further comprised of said first and second reference time values being adjustable according to user inputs via manual activation of said input means by the user.

18. A method for saving power in a monitor, comprising the steps of:

sensing whether an external input signal is received by a connector from input means connected to a computer and said monitor through said connector, and operating power means to supply operating voltages to said monitor while simultaneously setting a time value in a reference buffer indicative of a time for executing a power saving mode by responding to a power supply signal generated from said connector each time said external input signal is received by said connector;

performing a timing operation by counting a lapse of time until said power supply signal is generated and updating said time value set in said reference buffer each time a timer interrupt signal is received from a timer; and responding solely to said timing operation and a lack of generation of said power supply signal to execute said power saving mode by reading said time value set in said reference buffer, and cutting off operating voltages of said monitor when said power supply signal is not generated before the time indicated by the time value set in said reference buffer elapses.

19. The method as claimed in claim 18, wherein said operating voltages of said monitor are cut off by controlling said power means.

20. The method as claimed in claim 19, wherein the cutting off step comprises the steps of:

checking said time value set in said reference buffer, and maintaining a normal mode of operation when the time indicated by the time value set in said reference buffer has not elapsed; and establishing said power saving mode of operation by cutting off power supplied to said monitor when the time indicated by the time value set in said reference buffer elapses.

21. The method as claimed in claim 20, wherein said external input signal comprises a key clock signal generated from a keyboard.

22. The method as claimed in claim 20, wherein said external input signal comprises a signal generated from a mouse.

23. The method as claimed in claim 18, further comprising a step of adjusting said time value in said reference buffer according to user inputs.

24. A method for saving power in a monitor, comprising the steps of:

sensing whether an external input signal is received by a connector from input means connected to a computer and said monitor via said connector, and operating first and second power means while simultaneously setting first and second predetermined time values in first and second reference buffers, respectively, by responding to a power supply signal generated from said connector each time said external input signal is received by said connector, said first and second predetermined time values being indicative of times for executing first and second power saving modes of said monitor, respectively;

enabling performance of a timing operation by updating said first and second predetermined time values set in said first and second reference buffers, respectively, each time a timer interrupt signal is received;

checking said first and second predetermined time values set in said first and second reference buffers, respectively;

responding solely to said timing operation and a lack of generation of said power supply signal to execute said first power saving mode by cutting off a first voltage supplied to driving means of said monitor when said power supply signal is not generated before said time indicated by said first predetermined time value has elapsed, and alternatively, maintaining said first voltage when said power supply signal is generated before said time indicated by said first predetermined time value has elapsed; and responding solely to said timing operation and said lack of generation of said power supply signal to execute said second power saving mode by cutting off a second voltage supplied to a heater of a display unit of said monitor when said power supply signal is not generated before said time indicated by said second predetermined time value has elapsed, and alternatively, maintaining said second voltage when said power supply signal is generated before said time indicated by said second predetermined time value has elapsed.

25. The method as claimed in claim 24, wherein the sensing step further comprises the steps of:

performing a normal mode of operation by supplying said first and second voltages to said driving means and to said heater of said display unit, respectively, by simultaneously operating said first and second power means when said external input signal is received; and setting said first and second predetermined time values indicative of said times for executing said first and second power saving modes, respectively, in said first and second reference buffers, respectively.

26. The method as claimed in claim 25, wherein the cutting off steps further comprise the steps of:

checking said first predetermined time value in said first reference buffer, and maintaining said normal mode of operation when said first predetermined time value has not elapsed;

performing said first power saving mode by cutting off the first voltage supplied to said driving means of said monitor by controlling said first power means when said first predetermined time value in said first reference buffer has elapsed, while concurrently supplying the second voltage to said heater of said display unit of said monitor;

checking said second predetermined time value in said second reference buffer, and maintaining said first power saving mode when said second predetermined time value has not elapsed; and performing said second power saving mode by cutting off said second voltage supplied to said heater of said display unit of said monitor by controlling said second power means when said second predetermined time value in said second reference buffer has elapsed.

27. The method as claimed in claim 26, wherein said second predetermined time value is twice said first predetermined time value.

28. The method as claimed in claim 26, wherein said external input signal comprises a key clock signal generated from a key board.

29. The method as claimed in claim 26, wherein said external input signal comprises a signal generated from a mouse.

30. The method as claimed in claim 24, further comprising a step of adjusting said first and second predetermined time values according to user inputs via manual activation of said input means by the user.

31. A method for saving power in a monitor, comprising the steps of:

registering a time value in a time buffer, said time value being indicative of a time for performing a power saving mode of said monitor;

sensing whether an external input signal is received by a connector from input means connected to a computer and said monitor through said connector, and operating power means while simultaneously assigning said time value registered in said time buffer to a reference buffer by responding to a power supply signal generated from said connector each time said external input signal is received by said connector;

enabling performance of timing operation by updating said time value set in said reference buffer each time a timer interrupt signal is received from a timer in order to measure a lapse of time until said power supply signal is generated; and responding solely to said timing operation and a lack of generation of said power supply signal to perform said power saving mode by reading said time value set in said reference buffer, and cutting off operating voltages of said monitor by controlling said power means when said power supply signal is not generated before a time indicated by said time value set in said reference buffer elapses.

32. The method as claimed in claim 31, further comprising a step of adjusting said time value in said time buffer according to user inputs.

33. A method for saving power in a monitor, comprising the steps of:

registering a time value in a time buffer;

sensing whether an external input signal is received by a connector from input means connected to a computer and said monitor through said connector;

operating first and second power means while simultaneously reading said time value registered in said time buffer, generating first and second predetermined time values in dependence upon said time value, and assigning said first and second predetermined time values to first and second reference buffers as times for executing first and second power saving modes, respectively, by responding to a power supply signal generated from said connector each time said external input signal is received by said connector;

enabling performance of a timing operation by updating said first and second predetermined time values assigned to said first and second reference buffers each time a timer interrupt signal is received;

checking said first and second predetermined time values in said first and second reference buffers;

responding solely to said timing operation and a lack of generation of said power supply signal to execute said first power saving mode by cutting off a first voltage supplied to driving means of said monitor when said power supply signal is not generated before said first predetermined time value in said first reference buffer has elapsed, and alternatively, maintaining said first voltage when said power supply signal is generated before said first predetermined time value has elapsed; and responding solely to said timing operation and said lack of generation of said power supply signal to execute said second power saving mode by cutting off a second voltage supplied to a heater of a display unit of said monitor when said power supply signal is not generated before said second predetermined time value in said second reference buffer has elapsed, and alternatively, maintaining said second voltage when said power supply signal is generated before said second predetermined time value has elapsed.

34. The method as claimed in claim 33, further comprising a step of adjusting said time value in said time buffer in response to user inputs via manual activation of said input means by the user.

* * * * *